United States Patent
Yoshida et al.

(10) Patent No.: US 9,285,741 B2
(45) Date of Patent: Mar. 15, 2016

(54) INFORMATION INPUT DEVICE, CONTROL METHOD THEREOF AND IMAGE FORMING APPARATUS

(75) Inventors: Mayuko Yoshida, Osaka (JP); Takeshi Tani, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 487 days.

(21) Appl. No.: 13/272,909

(22) Filed: Oct. 13, 2011

(65) Prior Publication Data

US 2012/0092692 A1 Apr. 19, 2012

(30) Foreign Application Priority Data

Oct. 14, 2010 (JP) .................. 2010-231211

(51) Int. Cl.
*G06F 3/048* (2013.01)
*G03G 15/00* (2006.01)
*G06F 3/041* (2006.01)

(52) U.S. Cl.
CPC .............. *G03G 15/502* (2013.01); *G06F 3/041* (2013.01)

(58) Field of Classification Search
CPC ................. H04N 5/44543; G06F 2203/04807
USPC .................. 715/810, 747, 799, 863, 708, 808
See application file for complete search history.

(56) References Cited

U.S. PATENT DOCUMENTS

| | | | |
|---|---|---|---|
| 5,805,167 A * | 9/1998 | van Cruyningen | 715/808 |
| 2007/0058226 A1 | 3/2007 | Lu et al. | |
| 2008/0036743 A1* | 2/2008 | Westerman et al. | 345/173 |
| 2009/0091777 A1* | 4/2009 | Sato et al. | 358/1.13 |
| 2009/0228822 A1 | 9/2009 | Miyata | |
| 2010/0182248 A1* | 7/2010 | Chun | 345/173 |
| 2010/0309513 A1* | 12/2010 | Aizawa et al. | 358/1.15 |
| 2011/0013211 A1* | 1/2011 | Grosz et al. | 358/1.9 |
| 2011/0167341 A1* | 7/2011 | Cranfill et al. | 715/702 |
| 2012/0011437 A1* | 1/2012 | James et al. | 715/702 |
| 2012/0182296 A1* | 7/2012 | Han | 345/419 |

FOREIGN PATENT DOCUMENTS

| | | |
|---|---|---|
| JP | 2004282401 | 10/2004 |
| JP | 2007078726 | 3/2007 |
| JP | 2007109206 | 4/2007 |
| JP | 2008-117061 A | 5/2008 |
| JP | 2009-145903 A | 7/2009 |
| JP | 2009-217472 A | 9/2009 |

* cited by examiner

*Primary Examiner* — Kieu Vu
*Assistant Examiner* — Joy M Weber
(74) *Attorney, Agent, or Firm* — Keating & Bennett, LLP

(57) ABSTRACT

An information input device includes a display device that displays an information input screen image and a touch-panel that is arranged on the display device and specifies a designated position on the information input screen image. On a function setting area, a plurality of function setting keys are displayed and, if a flick operation to the right made by the input device on the function setting area is detected, detailed setting items corresponding to each of the function setting keys are displayed on a detailed settings area. Consequently, contents of detailed settings can be displayed at one time in correspondence with each of the function setting keys. Therefore, it becomes possible for the user to easily confirm whether or not function setting is appropriate, and to smoothly select a function.

19 Claims, 15 Drawing Sheets

INFORMATION INPUT DEVICE, CONTROL METHOD THEREOF AND IMAGE FORMING APPARATUS

CROSS-REFERENCE TO RELATED APPLICATION

This nonprovisional application claims priority under 35 U.S.C. §119(a) on Patent Application No. 2010-231211 filed in Japan on Oct. 14, 2010, the entire contents of which are hereby incorporated by reference.

BACKGROUND OF THE INVENTION

1. Field of the Invention

The present invention relates to an information input device and an image forming apparatus and, more specifically, to an information input device involving confirmation or input of settings of a large number of items, as well as to an image forming apparatus provided with the information input device.

2. Description of the Background Art

Recently, image forming apparatuses including copy machines having various and many copy functions and capable of high-speed copying have been developed and put on the market.

Larger number of functions leads to larger number of items to be set, and the manner of setting becomes complicated. Except for users who are familiar with such a device through daily use, it is difficult to handle skillfully the various and many functions of the device. Miscopies resulting from errors in operations for setting copy conditions are likely. Even if the user finds the setting error immediately after starting the copy, in a high-speed copy machine, a large number of copies would be taken before the once-started copy operation stops, wasting resources. Therefore, confirmation of set status and confirmation of the finish before executing a copy operation or the like are indispensable.

By way of example, Japanese Patent Laying-Open No. 2007-78726 (hereinafter referred to as '726 Reference) discloses an image forming apparatus providing confirmation of a plurality of functions selected by the user and providing expected output image. An operation panel of the image forming apparatus according to '726 Reference includes a function display unit, a detailed settings display unit, and a finish display unit. On the function display unit, icons representing manners of finish of a printout are displayed, and on the detailed settings display unit, detailed functions belonging to each icon are displayed, when an icon is selected. On the finish display unit, an expected finished image of the printout is displayed. According to this reference, it is possible to simultaneously confirm the currently set function and details thereof as well as the finished image.

Japanese Patent Laying-Open No. 2007-109206 (hereinafter referred to as '206 Reference) discloses an image processing apparatus provided with a user interface device of improved operability. The image processing apparatus of '206 Reference displays an image as an object of processing or an expected finished image on display means. If any position of the displayed image is designated, functions corresponding to the designated area are displayed, to receive setting of a function for the image. If a function is set, an expected finished image representing the result of processing in accordance with the set function is displayed on the display means. Hence, according to this reference, in response to an operation of designating a portion on the expected finished image, function setting items that can be set area by area can be appropriately and clearly presented, so that appropriate selection of the function setting items becomes possible and operability in setting operations is improved.

By the inventions disclosed in '726 and '206 References, detailed contents of selected functions can be displayed. It is, however, impossible to display detailed contents of a plurality of functions at one time.

Therefore, in an image forming apparatus having multiple functions with a large number of setting items, it is difficult for a user to confirm the overall status of settings, and possibility of miscopies still remains. Input of each and every setting item leads to more complicated operations.

SUMMARY OF THE INVENTION

In view of the problem described above, it is desirable to provide an information input device and an image forming apparatus allowing confirmation of set status and smooth setting of functions by the user, by displaying, at one time, detailed contents of a plurality of function setting items displayed on an operation panel.

According to an aspect, the present invention provides an information input device, including a display unit that displays an information input screen image allowing input of information, and an input unit that is arranged on the display unit and specifies a designated position on the information input screen image; wherein a plurality of function setting keys are displayed on a function setting area displayed on a part of the information input screen image; in response to detection of a prescribed operation by the input unit on the function setting area, the display unit displays setting items corresponding to each of the plurality of function setting keys as detailed setting items, in correspondence with the function setting keys, on the information input screen image; and the prescribed operation is an operation different from an operation for displaying, when the position of any of the function setting keys is specified by the input unit, setting items corresponding to the function setting key.

Preferably, the detailed setting items displayed in correspondence with each of the function setting keys are setting items selected in order of frequency of use from among a plurality of setting items corresponding to each of the function setting keys.

More preferably, the display unit displays a set detailed setting item in a noticeable manner, among the detailed setting items displayed in correspondence with each of the function setting keys.

Further preferably, ten keys for numerical input are displayed horizontally in line on the information input screen image; and the ten keys are positioned above or below the detailed setting items.

Preferably, a plurality of task trigger keys for instructing an operation of an apparatus as an object of function setting are arranged horizontally in line on the information input screen image; and the plurality of task trigger keys are positioned above or below the detailed setting items.

More preferably, at least one of the detailed setting items has a dialog displayed in a pull-down form on the information input screen image if position of the detailed setting item is specified by the input unit, the dialog includes further setting items corresponding to the specified detailed setting item; and the detailed setting item having the dialog displayed is displayed at an upper portion of the information input screen image.

Further preferably, the display unit displays, if a position of any of the function setting keys is specified by the input unit with the detailed setting items being displayed, a sub-screen including items other than the displayed detailed setting items, among setting items related to the function setting key.

Preferably, the sub-screen includes only items other than the displayed detailed setting items, among setting items related to the function setting key.

More preferably, among the setting items related to the function setting key, items other than the displayed detailed setting items are displayed in more distinguishable manner than the displayed detailed setting items, in the sub-screen.

The present invention provides an image processing apparatus, including the above-described information input device, and receiving a user operation through the information input device.

The present invention further provides a method of controlling an information input device that includes a display unit displaying an information input screen image allowing input of information, and an input unit that is arranged on the display unit and specifies a designated position on the information input screen image, including the steps of displaying, on a function setting area displayed on a part of the information input screen image, a plurality of function setting keys; detecting a prescribed operation made by the input unit on the function setting area; and in response to detection of the prescribed operation made by the input unit on the function setting area, displaying setting items corresponding to each of the plurality of function setting keys as detailed setting items, in correspondence with the function setting keys, on the information input screen image; wherein the prescribed operation is an operation different from an operation for displaying, when the position of any of the function setting keys is specified by the input unit, setting items corresponding to the function setting key.

Preferably, the detailed setting items displayed in correspondence with each of the function setting keys are setting items selected in order of frequency of use from among a plurality of setting items corresponding to each of the function setting keys.

More preferably, the control method further includes the step of displaying a set detailed setting item in a noticeable manner, among the detailed setting items displayed in correspondence with each of the function setting keys.

Further preferably, the control method further includes the step of displaying ten keys for numerical input horizontally in line on the information input screen image; and the ten keys are positioned above or below the detailed setting items.

Preferably, the control method further includes the step of displaying a plurality of task trigger keys for instructing an operation of an apparatus as an object of function setting, horizontally in line on the information input screen image; and the plurality of task trigger keys are positioned above or below the detailed setting items.

More preferably, at least one of the detailed setting items has a dialog displayed in a pull-down form on the information input screen image if the position of the detailed setting item is specified by the input unit, the dialog includes further setting items corresponding to the specified detailed setting item; and the detailed setting item having the dialog displayed is displayed at an upper portion of the information input screen image.

Further preferably, the control method further includes the step of displaying, if a position of any of the function setting keys is specified by the input unit with the detailed setting items being displayed, a sub-screen including items other than the displayed detailed setting items, among setting items related to the function setting key.

Preferably, the sub-screen includes only items other than the displayed detailed setting items, among to setting items related to the function setting key.

More preferably, among the setting items related to the function setting key, items other than the displayed detailed setting items are displayed in more distinguishable manner than the displayed detailed setting items, in the sub-screen.

According to the present invention, for the plurality of function setting keys displayed on the function setting area, contents of detailed settings can be displayed at one time in correspondence with each of the function setting keys. Therefore, the user can easily confirm whether the set function is appropriate or not. This helps smooth selection of a function by the user.

Further, as represented by the detailed settings window displayed for each function setting key displayed in the function setting area, not all the detailed functions are displayed but items of higher frequency of use are displayed with higher priority. This helps more smooth selection of a function by the user.

Further, as the currently set item is displayed in a distinguishable manner, the user can smoothly change the setting.

Further, since the manner of displaying ten keys is changed in accordance with the layout of screen image, numerical input can be done while effectively utilizing the screen space.

Further, since the manner of displaying the task trigger keys is changed in accordance with the layout of screen image, operation instructions for the image forming apparatus can be issued while effectively utilizing the screen space.

Further, since the setting items displayed as a dialog of pull-down form is arranged on an upper side of the screen image, the dialog can be opened downward from the setting items, when the user designates pull-down. This further helps smooth selection of a function by the user, without bringing any feeling of strangeness to the user.

Further, while detailed setting items for various function setting keys are displayed, if a specific function setting key is pressed, items other than the already displayed detailed setting items are displayed distinctively in a sub-screen (function setting window), or only the items other than the already displayed detailed setting items are displayed on the function setting window. This helps smooth selection of a function by the user, without causing any confusion of the user.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
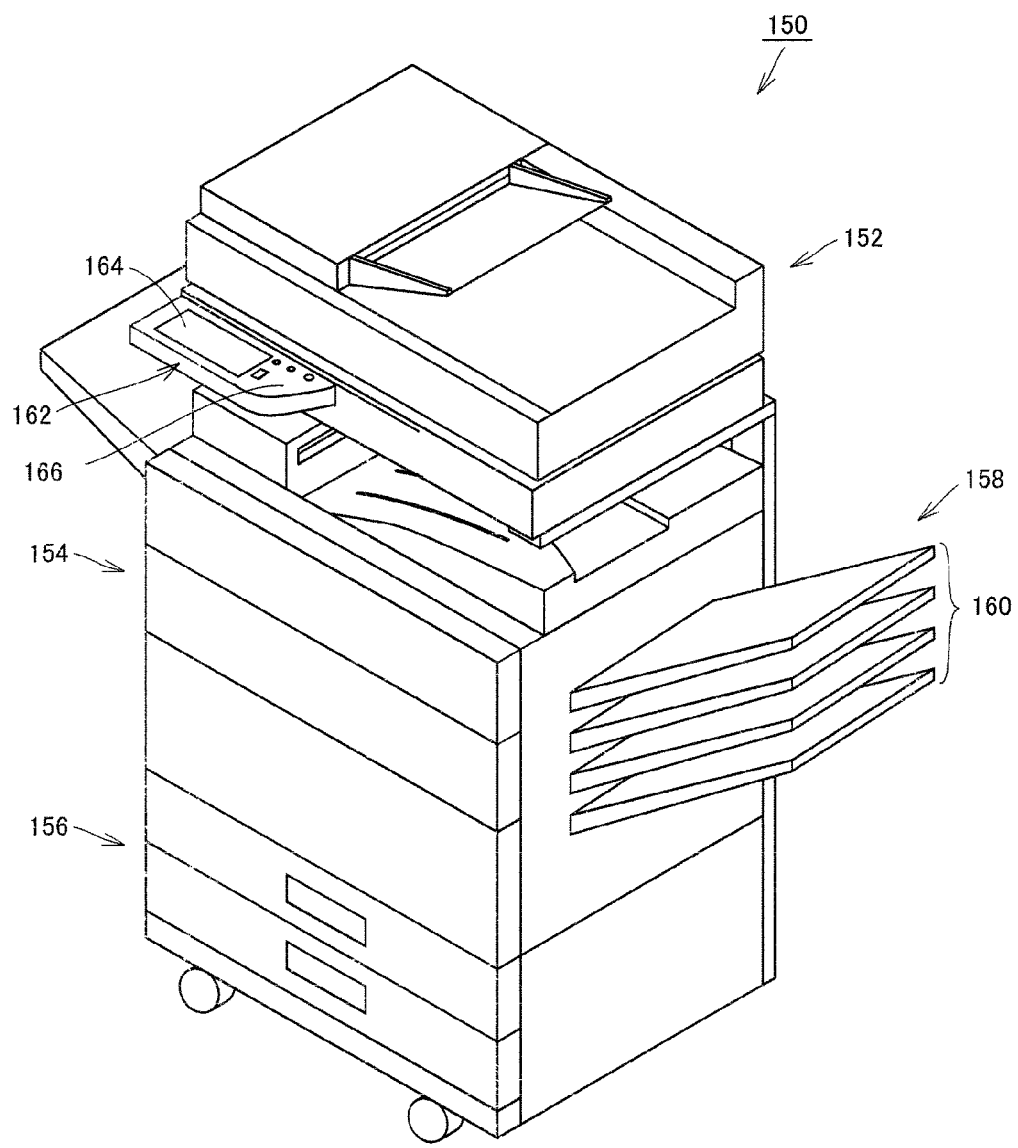
FIG. 1 is a perspective view showing an appearance of an image forming apparatus in accordance with an embodiment of the present invention.

In the following description and the drawings, the same components are denoted by the same reference characters. Their names and functions are also the same. Therefore, detailed description thereof will not be repeated.

In the following, embodiments of the present invention will be specifically described with reference to appended figures.

<Image Forming Apparatus>

Referring to FIG. 1, an image forming apparatus 150 in accordance with an embodiment of the present invention includes: a document reading unit 152; an image forming unit 154; a paper feed unit 156; a discharge unit 158 having a paper discharge tray 160; and an information input device 162. Information input device 162 is an operation console causing image forming apparatus 150 to execute prescribed functions, for making various settings related to the image forming apparatus 150. Information input device 162 has a display unit 164 and an operation unit 166.

<Hardware Block>

Figure 2:
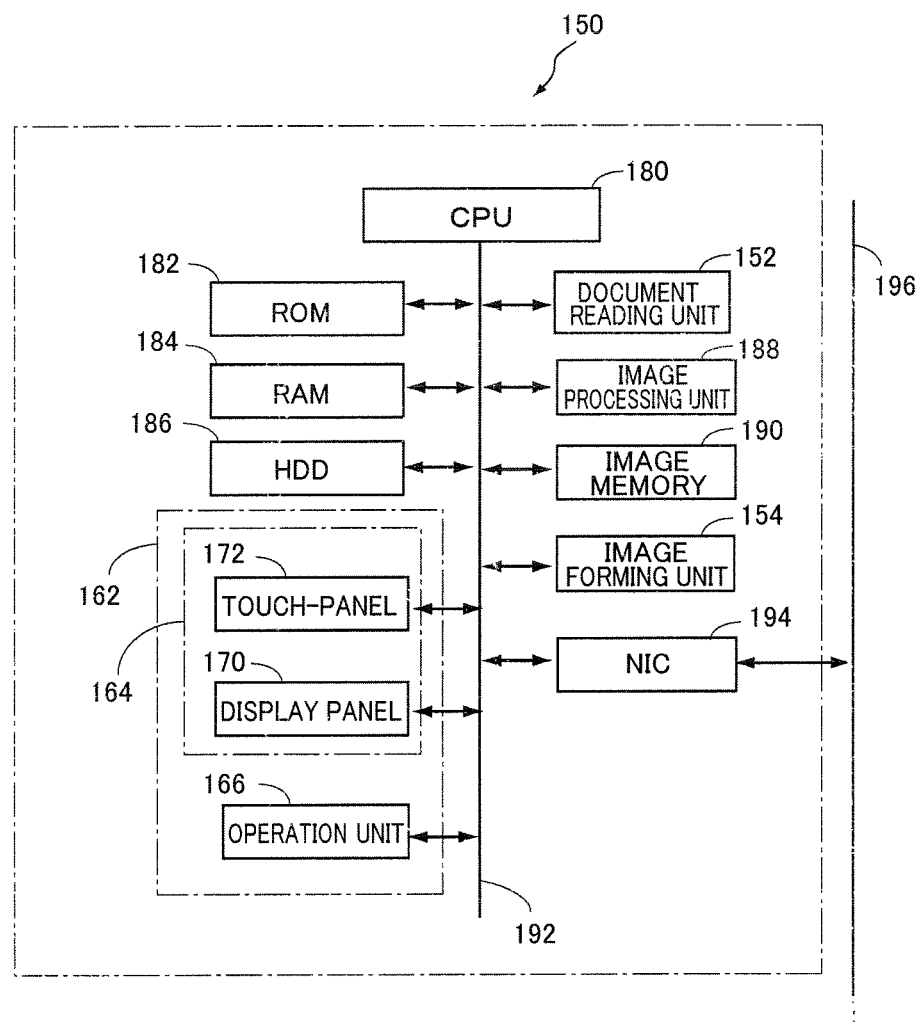
FIG. 2 is a functional block diagram showing hardware configuration of the image forming apparatus shown in FIG. 1.

Referring to FIG. 2, inside image forming apparatus 150, a CPU (Central Processing Unit) 180, an ROM (Read Only Memory) 182, an RAM (Random Access Memory) 184 and a HDD (Hard Disk Drive) 186 are provided. CPU 180 is for overall control of image forming apparatus 150. ROM 182 stores programs and the like. RAM 184 is volatile storage. HDD 186 is non-volatile storage that retains data even when power is turned off. ROM 182 stores programs and data necessary for controlling operations of image forming apparatus 150. Display unit 164 of information input device 162 is formed of a display panel 170 and a touch-panel 172. Display panel 170 is a display device such as a liquid crystal display. Touch-panel 172 for detecting a pressed position is superposed thereon.

Image forming apparatus 150 is further provided with an image processing unit 188, an image memory 190, a bus 192 and an NIC (Network Interface Card) 194. CPU 180, ROM 182, RAM 184, HDD 186, information input device 162 (display panel 170, touch-panel 172 and operation unit 166), NIC 194, document reading unit 152, image processing unit 188, image memory 190, image forming unit 154 and the like are connected to bus 192. Data (including control information) are exchanged among these units through bus 192. CPU 180 reads a program from ROM 182 to RAM 184 through bus 192, and executes the program using a part of RAM 184 as a work area. Specifically, CPU 180 controls various units forming image forming apparatus 150 in accordance with a program or programs stored in ROM 182, to realize various functions of image forming apparatus 150. NIC 194 is connected to an external network 196, and functions as an interface for communication through network 196.

<Information Input Device>

Figure 3:
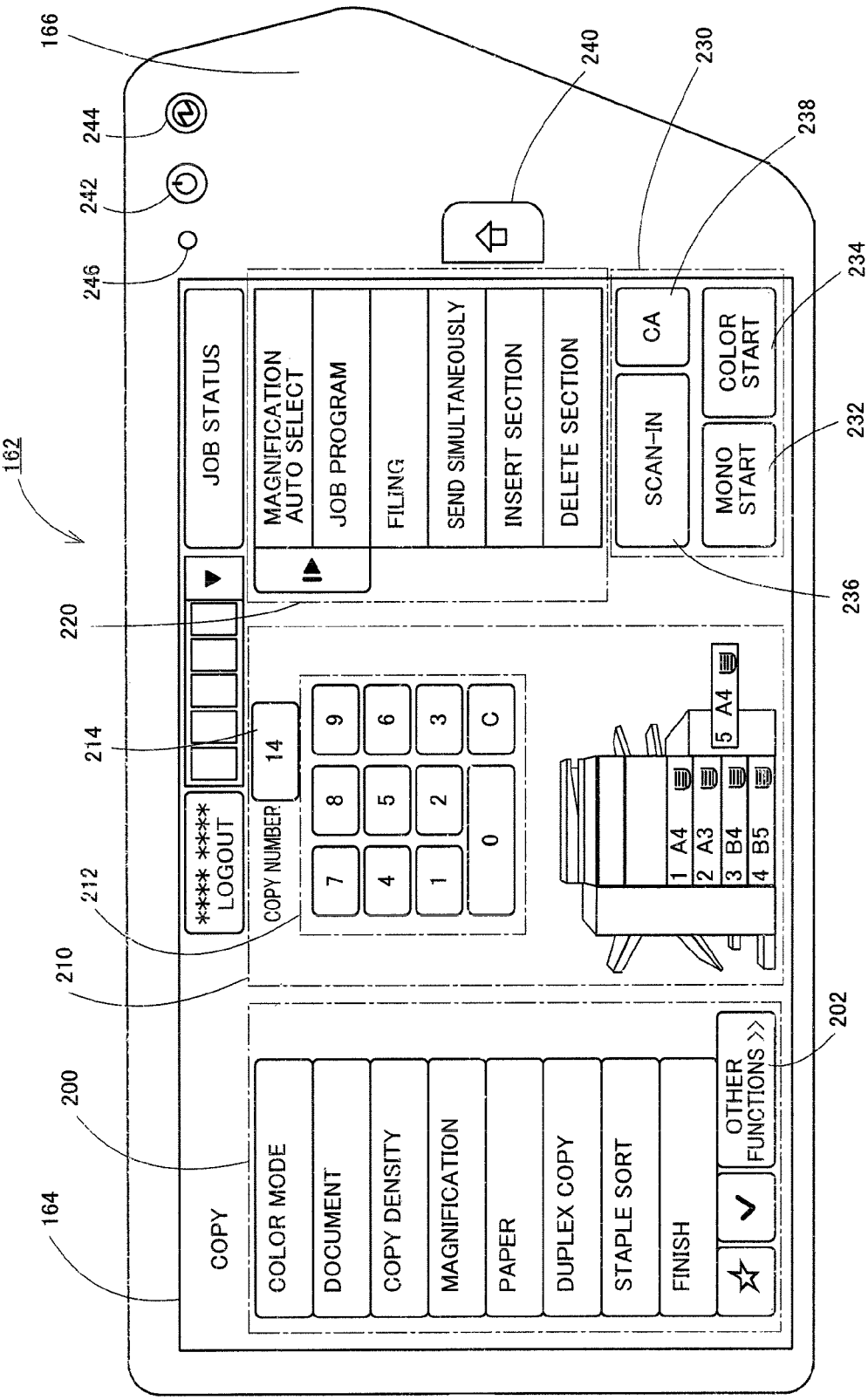
FIG. 3 is a plan view showing an information input device provided on the image forming apparatus shown in FIG. 1.

Referring to FIG. 3, information input device 162 is formed by integrating display unit 164 and operation unit 166. Specifically, operation unit 166 includes a home key 240, a power key 242 and a power save key 244 as hard keys, and a power LED 246. Power key 242 is for turning on/off the power supply to image forming apparatus 150. Power save key 244 is for setting image forming apparatus 150 to a power save mode. Power LED 246 is lit when the power of image forming apparatus 150 is turned on. Home key 240 is a key for displaying a home screen image (a screen image on which keys of frequently used functions are registered) on display unit 164.

The screen image displayed on display unit 164 includes a function setting area 200, a preview area 210, an action panel area 220 and a task trigger area 230. On function setting area 200, a plurality of keys (hereinafter referred to as function setting keys) for setting various functions of image forming apparatus 150 are displayed. On function setting area 200 of FIG. 3, only a part of function setting keys is displayed. Function setting keys that are not displayed appear if "other functions" key 202 is pressed. Preview area 210 includes a ten key area 212 and a copy number display area 214. The number of copies is input by the ten keys arranged on ten key area 212. In FIG. 3, the number of copies is set to 14.

On action panel area 220, pieces of information related to assistance, guidance and suggestion related to the operation are displayed. For instance, if a user selects a specific function, functions related to the selected function are displayed on action panel area 220. Other functions for objects common to the selected function may be displayed.

On task trigger area 230, keys as triggers causing image forming apparatus 150 to start certain processes are displayed. Specifically, a monochrome start key 232 for starting monochrome copy, a color start key 234 for starting color copy, a scan-in key 236 for starting a process for once reading a document and providing a preview for copying or for FAX transmission, and a CA key 238 for clearing all settings are displayed.

In information input device 162, the state of image forming apparatus 150 and the job processing status are confirmed, by screen images displayed on display panel 170. By selecting a prescribed area on the screen image displayed on display panel 170 (an area including a letter, figure or the like, corresponding to one key) on touch-panel 172 superposed on display panel 170 (by pressing the corresponding portion of touch-panel 172), function setting or operation instruction to image forming apparatus 150 can be realized.

In information input device 162, to determine whether or not a displayed key is pressed, known technique may be used. By way of example, correspondence between two-dimensional coordinates of touch-panel 172 and two-dimensional coordinates of display panel 170 is determined beforehand, and whether or not the position pressed on touch-panel 172 is included in any area of a letter or a figure displayed on display panel 170 is determined.

<Software Configuration>

In the following, a process in which information input device 162 is operated by a user and image forming apparatus 150 realizes the express mode will be described. Image forming apparatus 150 in accordance with the present embodiment allows function setting in two different modes, that is, "regular mode" and "express mode." A mode in which any of the function setting keys displayed on function setting area 200 is pressed and detailed settings is done on a sub-screen (window) that opens in response is referred to as the regular mode. Basically, in the regular mode, a setting window must be opened function by function. In contrast, a mode in which detailed settings can be made without pressing the function setting key, that is, a mode that allows detailed settings faster than in the regular mode, is referred to as the express mode.

In the following, various processes are realized by CPU 180 executing programs read from ROM 182. In the following, that a prescribed area displayed on display panel 170 (for example, a key) is pressed means that a corresponding portion of touch-panel 172 is pressed.

Figure 4:
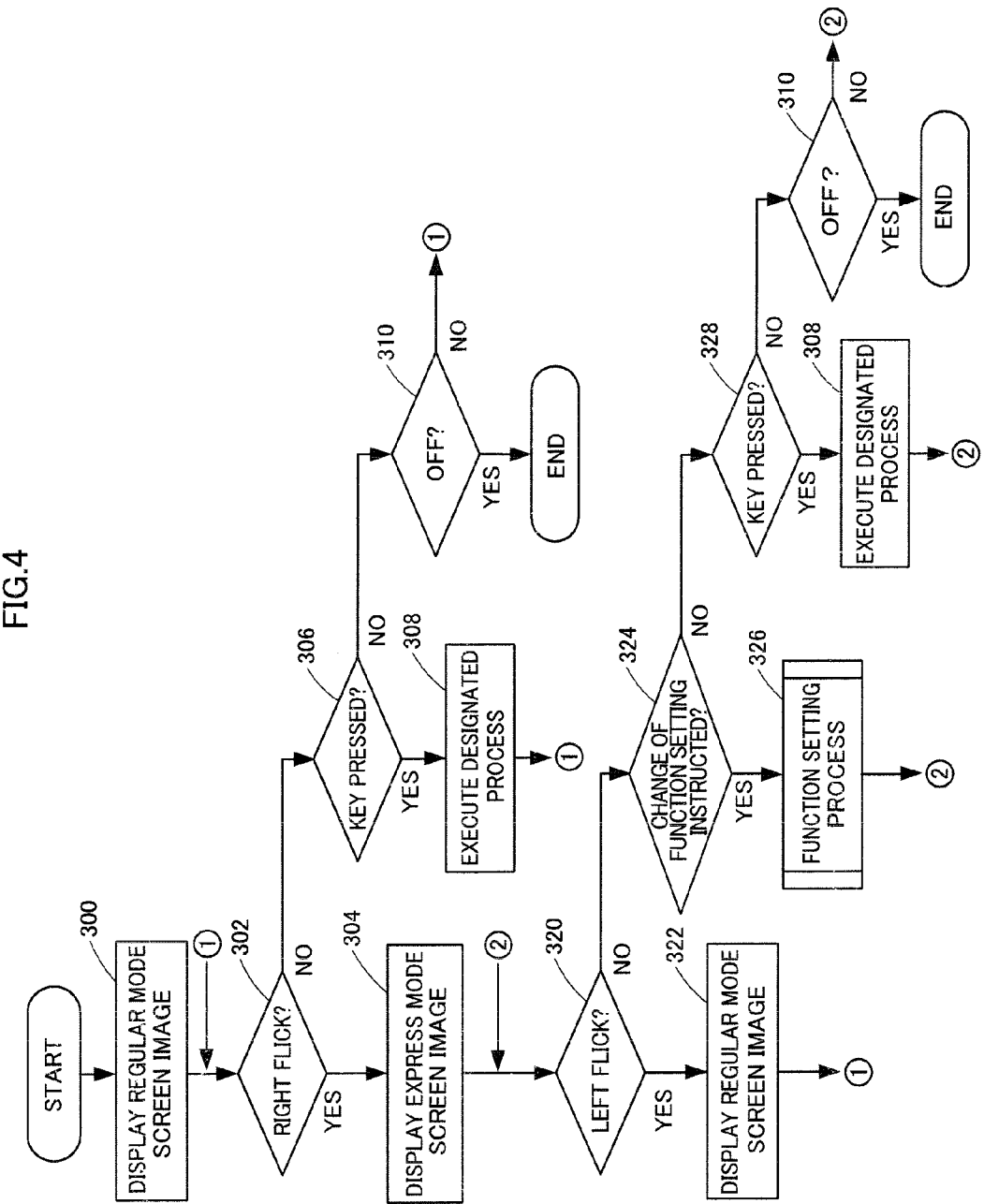
FIG. 4 is a flowchart representing a control structure of a program for realizing an express mode in the image forming apparatus in accordance with an embodiment of the present invention.
Figure 6:
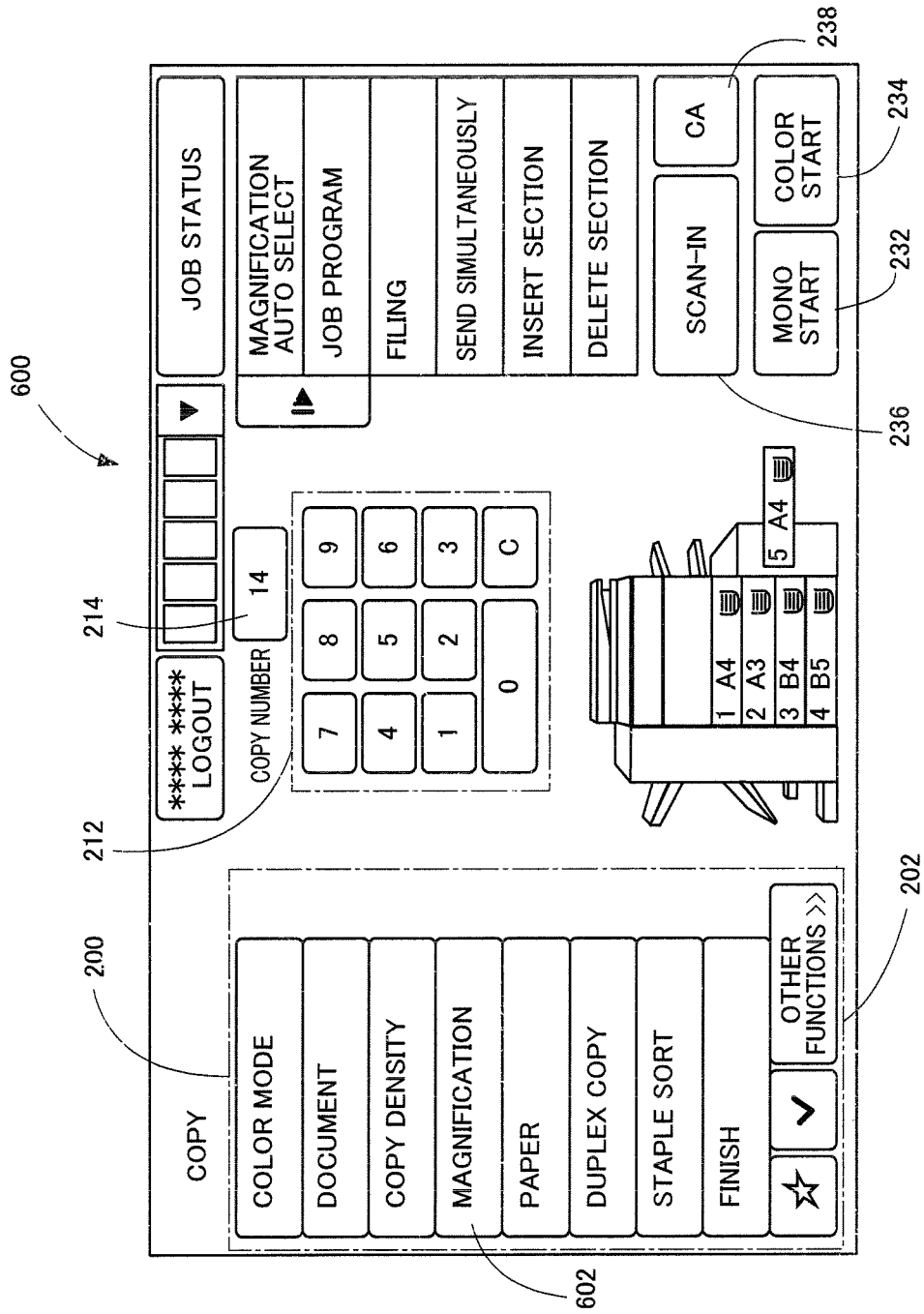
FIG. 6 shows an example of a regular mode screen image.

Referring to FIG. 4, when image forming apparatus 150 is activated, at step 300 of a program for realizing the express mode, CPU 180 displays a regular mode screen image 600 shown in FIG. 6 on display panel 170. Regular mode screen image 600 is a screen image corresponding to a normal mode before execution of the express mode.

At step 302, CPU 180 determines whether or not the user has made a "flick operation" to the right direction on function setting area 200. The flick operation refers to an operation of lightly sweeping one's finger or the like touching touch-panel 172 in one direction. This operation can be determined by monitoring time change of a touched position on touch-panel 172.

At step 302, if it is determined that a flick operation to the right has been made, control proceeds to step 304. If it is determined that a flick operation to the right has not been made, control proceeds to step 306.

Figure 7:
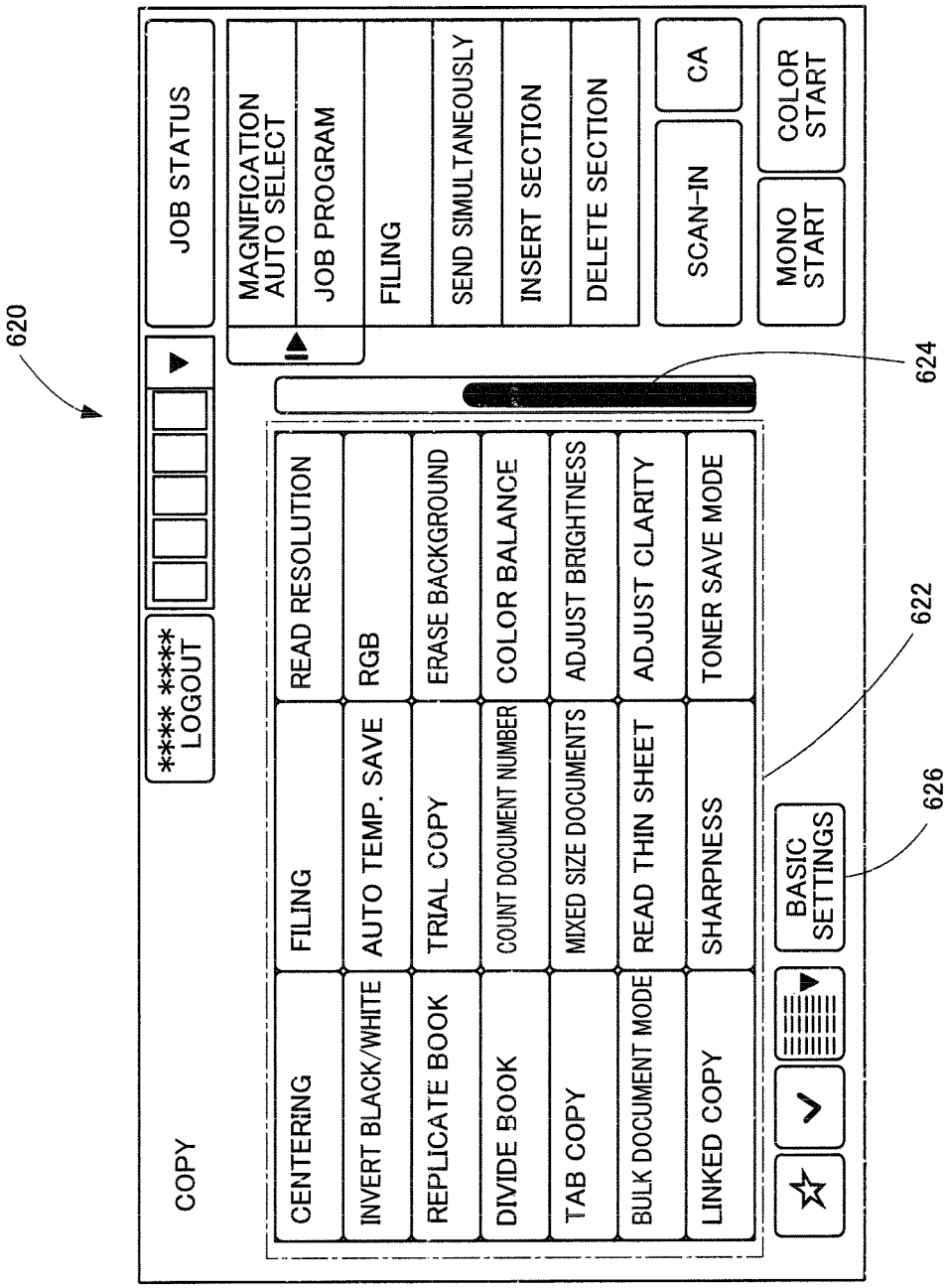
FIG. 7 shows an example of a function list displayed when "other functions" key is pressed on the regular mode screen image of FIG. 6.

At step 306, CPU 180 determines whether or not any key has been pressed on regular mode screen image 600. If it is determined that any key has been pressed, control proceeds to step 308. At step 308, CPU 180 executes the corresponding process. By way of example, if "other functions" key 202 is pressed on regular mode screen image 600, a screen image 620 shown in FIG. 7 is displayed. On screen image 620, a list of functions is displayed on function list display area 622. Since not all functions are displayed on screen image 620, a scroll bar 624 for scrolling the list display is displayed on the right side of function list display area 622. On screen image 620, by pressing any of the displayed areas, a corresponding function can be set. When basic setting key 626 is pressed, the display returns to regular mode screen image 600.

Figure 8:
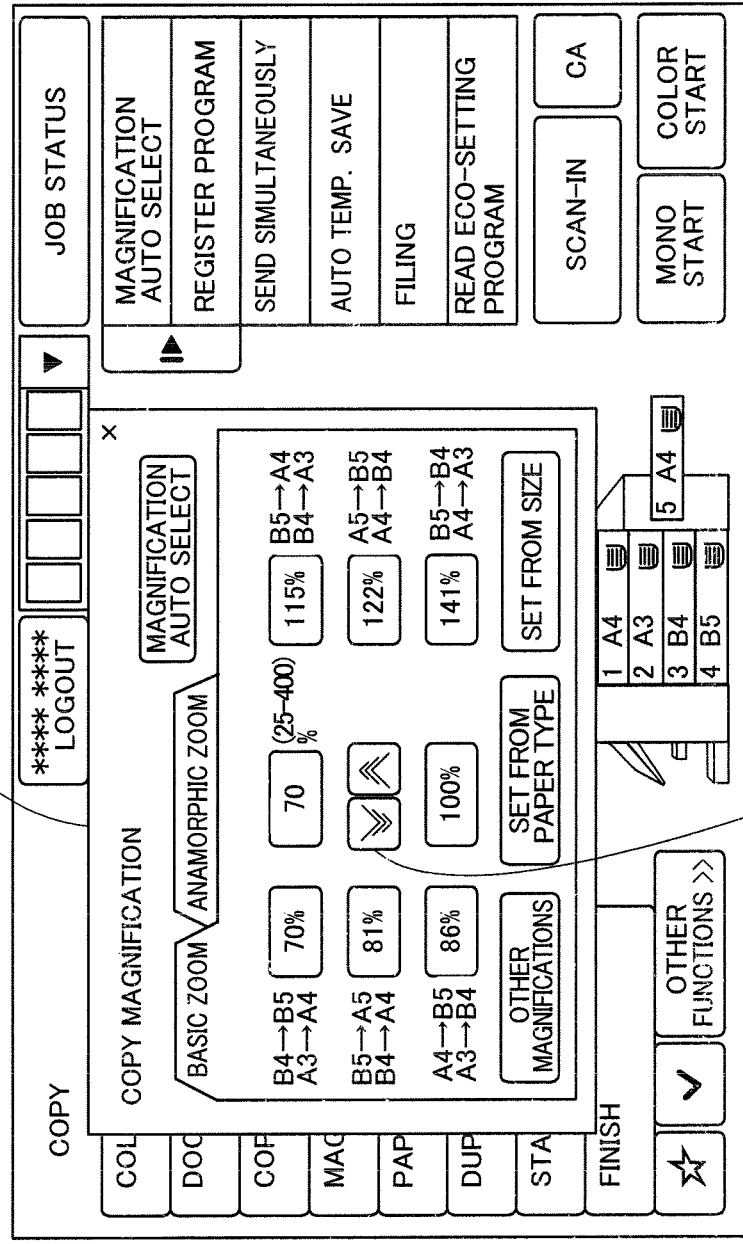
FIG. 8 shows an example of a screen image displayed when a magnification key is pressed on the regular mode screen image of FIG. 6.

If any of the function setting keys on function setting area 200 is pressed, a corresponding detailed settings window is displayed. For instance, if magnification key 602 is pressed, a screen image 640 shown in FIG. 8 is displayed. On screen image 640, a magnification setting window 642 is displayed, overlapped on regular mode screen image 600. Setting of copy magnification using magnification setting window 642 is realized by pressing a key of percentage indication and thereby directly designating the magnification, or by designating a numerical value in the range of 25 to 400 by pressing up and down keys 644. "Other magnifications" key is for displaying preset magnifications other than the magnifications displayed on magnification setting window 642. After setting is complete, when magnification setting window 642 is closed by pressing a sign "×" at the upper right corner, the display returns to regular mode screen image 600.

If it is determined at step 306 that no key has been pressed, control proceeds to step 310. At step 310, CPU 180 determines whether or not an OFF operation has been made, that is, whether or not power key 242 has been pressed. If it is determined that power key 242 has been pressed, the present program ends. If it is determined that power key 242 has not been pressed, control returns to step 302.

As described above, at steps 302, 306 and 310, CPU 180 waits for a user operation while regular mode screen image 600 is being displayed, and if it is determined that a flick operation to the right is made, control enters the express mode, which will be described in the following.

Figure 9:
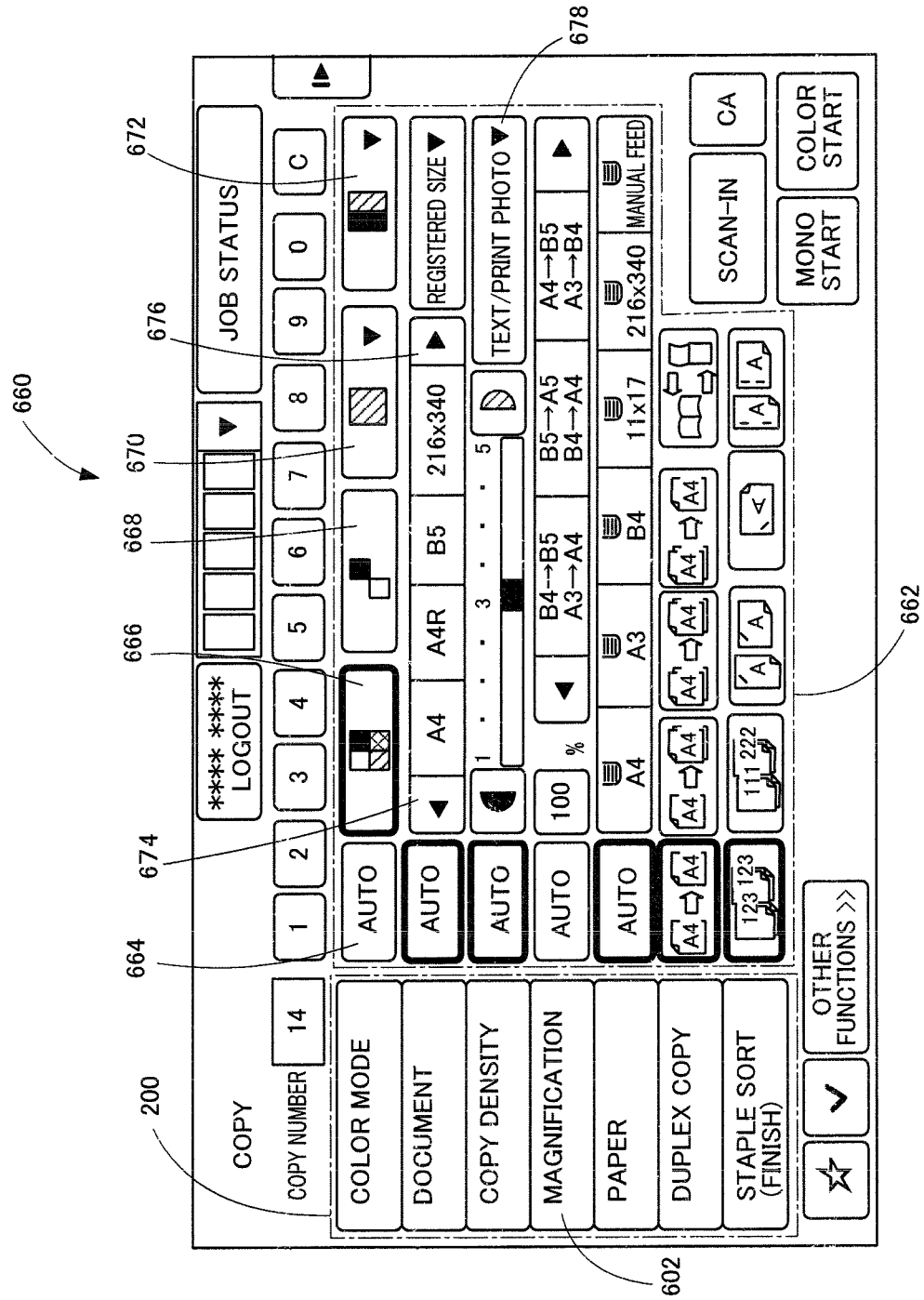
FIG. 9 shows an example of an express mode screen image.

At step 304, CPU 180 displays express mode screen image 660 shown in FIG. 9. In express mode screen image 660, detailed settings area 662 is displayed on the right side of function setting area 200. In detailed settings area 662, keys representing items (detailed setting items) that can be set with respect to each function setting key are displayed horizontally, on the right side of various function setting keys. By way of example, on the right side of color mode key, an auto key 664, a color print key 666, a monochrome print key 668, a single color print key 670, and two-color print key 672 are displayed, in this order from the left side. In detailed settings area 662, state of each function set at present is displayed in an emphasized manner. In FIG. 9, the set state is displayed surrounded by a thick frame. Here, color mode is set to "color print," document is set to "auto," copy density is set to "auto," paper is set to "auto," duplex copy is set to "one sided copy," and staple sort (finish) is set to sort, to provide sets of printouts of the desired copy number. As to the magnification, since document and paper are set to "auto," magnification is determined accordingly.

In FIG. 9, A4, A4R, B5, 216×340 are displayed as types of selectable documents. By pressing a left scroll key 674 or a right scroll key 676, display between these two scroll keys can be changed, or types of documents that have not been viewable can be displayed. The left and right scroll keys are also displayed for the magnification. By changing the display between the two scroll keys, magnifications that have not been viewable can be displayed.

In function setting area 200 of express mode screen image 660, the "staple sort" key and "finish" key displayed on regular mode screen image 600 are collectively displayed as "staple sort (finish)" key. This is because the ten keys and the clear key that are displayed in ten key area 212 of regular mode screen image 600 are displayed horizontally in line above detailed settings area 662. By arranging ten keys horizontally in line, it becomes possible to input a numerical value, such as the number of copies, even in the express mode screen image 660.

Since the size in the widthwise direction of detailed settings area 662 is limited, it is impossible to display all settable keys for some functions. For a function of which all settable keys cannot be displayed, representative keys (for example, basic keys or keys used frequently) are displayed. Setting of an item not displayed in detailed settings area 662 can be made by pressing a corresponding function setting key on function setting area 200, as will be described later.

At step 320, CPU 180 determines whether or not a flick operation to the left has been made on detailed settings area 662. If it is determined that a flick operation to the left has been made, control proceeds to step 322. At step 322, CPU 180 displays regular mode screen image 600. Thereafter, control returns to step 302. If it is determined that a flick operation to the left has not been made, control proceeds to step 324.

At step 324, CPU 180 determines whether or not a function setting change instruction has been given. Specifically, CPU 180 determines whether or not a function setting key on function setting area 200 or a key displayed on detailed settings area 662 has been pressed. If it is determined that the function setting change instruction has been given, control proceeds to step 326. At step 326, CPU 180 performs the function setting process. Thereafter, control returns to step 320.

If it is determined at step 324 that function setting change instruction is not given, control proceeds to step 328. At step 328, CPU 180 determines whether or not any key other than the function setting keys in function setting area 200 or keys displayed on detailed settings area 662 has been pressed, on express mode screen image 660. If it is determined that any key has been pressed, control proceeds to step 308. At step 308, CPU 180 executes the corresponding process. If it is determined at step 328 that no key has been pressed, control proceeds to step 310. Steps 308 and 310 are the same as described above except that the flow returns to step 320 and, therefore, description will not be repeated.

As described above, with express mode screen image 660 displayed, at steps 320, 324, 328 and 310, CPU 180 waits for a user operation. If there is a function setting change instruction, CPU 180 executes the function setting process as described in the following.

Figure 5:
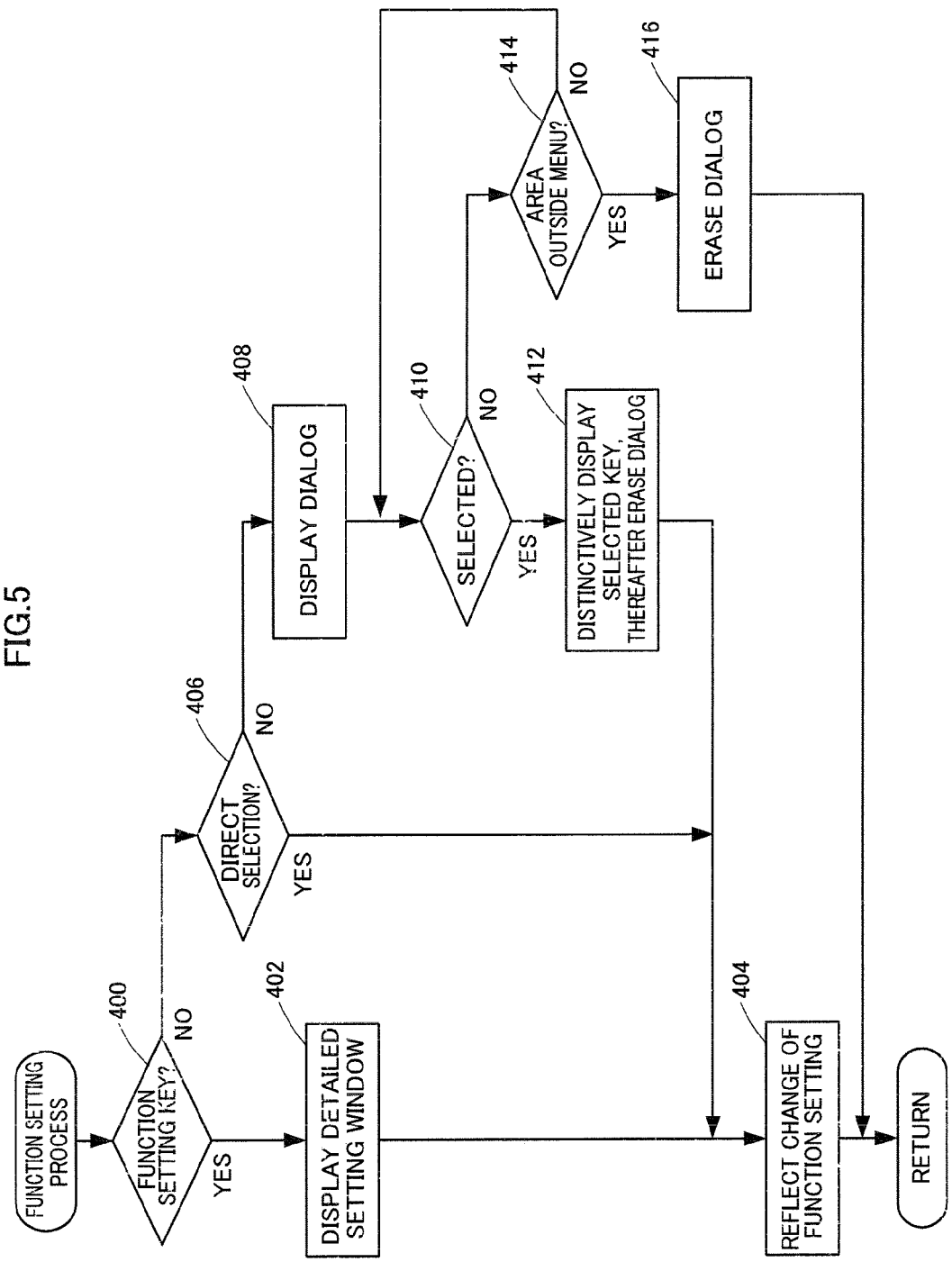
FIG. 5 is a flowchart representing a control structure of a program for realizing a function setting process shown in FIG. 4.

At step 400 of a program for realizing the function setting process (FIG. 5), CPU 180 determines whether or not the key pressed at step 324 is a function setting key on function setting area 200. If it is determined to be a function setting key, at step 402, CPU 180 displays a sub-screen (hereinafter referred to as a detailed settings window) for setting details, overlapped on express mode screen image 660. If setting is completed on the detailed settings window, control proceeds to step 404. At step 404, CPU 180 reflects the selected function, and erases the detailed settings window. Thereafter, control returns to express mode screen image 660.

Figure 10:
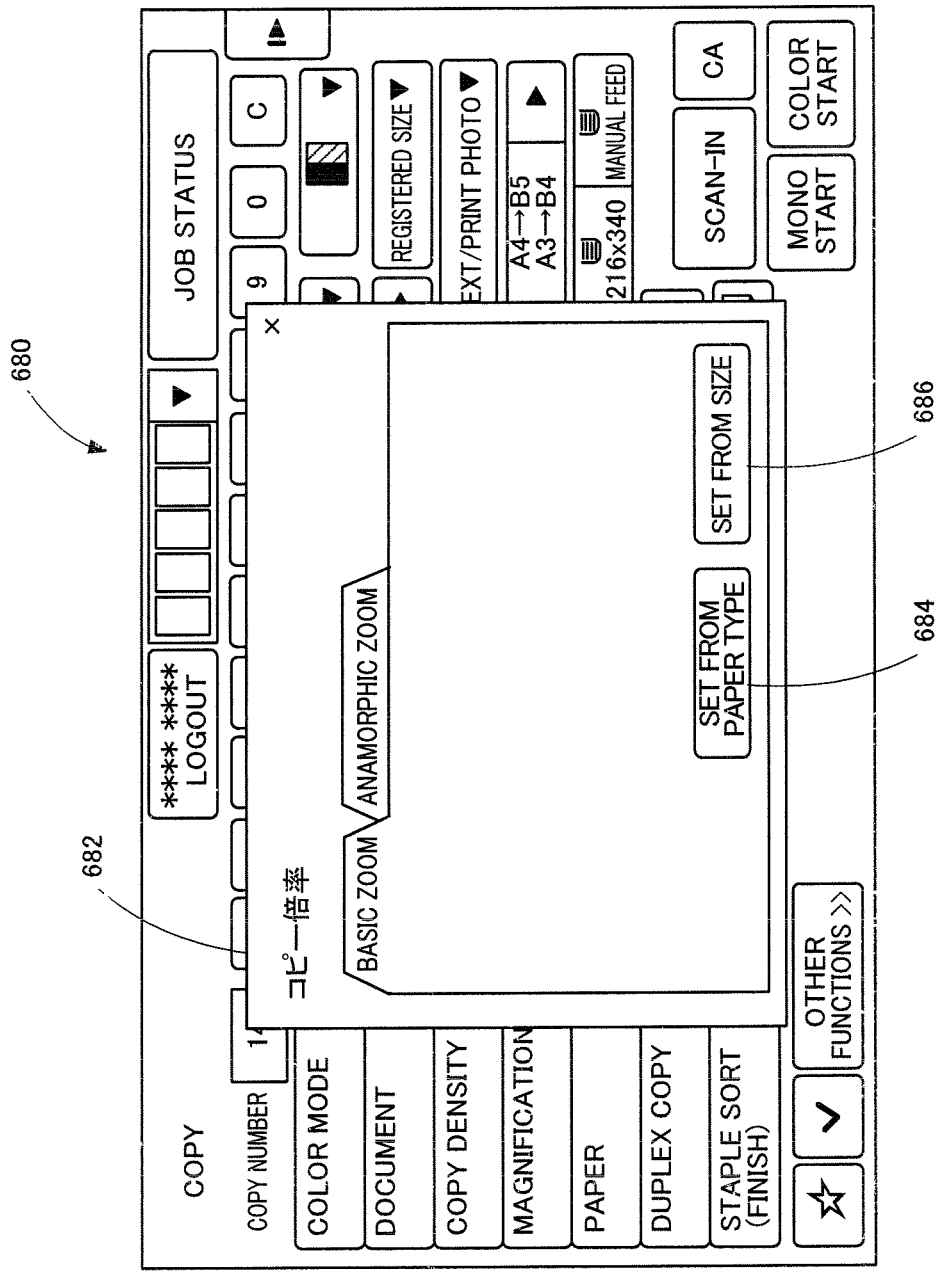
FIG. 10 shows an example of a screen image displayed when the magnification key is pressed on the express mode screen image shown in FIG. 9.

By way of example, if the key pressed on express mode screen image 660 (key determined to be pressed at step 324) is magnification key 602, screen image 680 shown in FIG. 10 is displayed. On screen image 680, a magnification setting window 682 is displayed. Magnification setting window 682 is different from magnification setting window 642 displayed on screen image 640 of FIG. 8, which is displayed when magnification key 602 is pressed on regular mode screen image 600. On magnification setting window 682, only two keys related to "basic magnification" ("set from paper type" key 684 and "set from size" key 686) and a tub for realizing "anamorphic zoom" are displayed. The reason for this is that setting items (keys) related to magnification other than these are displayed on detailed settings area 662 of express mode screen image 660 shown in FIG. 9. In FIG. 9, "other magnifications" and the like are not displayed. As described above, by scrolling the display between the two scroll keys displayed on the same line as magnification key 602, "other magnifications" and the like can be made viewable. As described above, on the detailed settings window opened when a specific function setting key is pressed (for example, the magnification setting window opened when magnification key is pressed), only the items not displayed on detailed settings area 662 are displayed.

By way of example, items that can be set only on the detailed settings window displayed on express mode screen image 660 (items that cannot be set on detailed settings area 662) include the following: in connection with "document", "size input," "size registration/cancellation" and "switching between AB designation and inch-size designation"; in connection with "copy density," "copy document mode" and "color enhancement"; in connection with "paper," "change of manual tray setting"; and in connection with "staple sort (finish)," "saddle stitch setting."

If it is determined at step 400 that the key pressed at step 324 is not a function setting key, control proceeds to step 406. At step 406, CPU 180 determines whether or not the key pressed at step 324 is a directly selectable key in detailed settings area 662. On detailed settings area 662, keys that allow direct setting of functions when pressed, and keys displaying further items (keys) when pressed to urge selection from the displayed items, are displayed. On a key invoking display of further items has an inverted triangle displayed at a right end of the key. By way of example, auto key 664, color print key 666 and monochrome print key 668 displayed on the right side of "color mode" are keys allowing direct selection of a function. Single color print key 670, two-color print key 672, text/print photo key 678 on the line of "copy density" and a registration size key on the line of "document" are keys for displaying further items in the pull-down form. These keys are arranged on the upper side of the screen image, and more specifically, an upper right side of detailed settings area 662.

At step 406, if it is determined that the key allows direct selection, control proceeds to step 404. At step 404, CPU 180 reflects the selected function and the control returns to the main routine. At step 406, if it is determined that the key does not allow direct selection, control proceeds to step 408. At step 408, CPU 180 displays a dialog including further items in a pull-down form. By way of example, if text/print photo key 678 is pressed, a dialog 702 is, displayed below text/print photo key 678 as shown in screen image 700 of FIG. 11.

At step 410, CPU 180 determines whether or not any of the items displayed on dialog 702 has been selected, or any of the keys has been pressed. If it is determined that any of the keys in dialog 702 is pressed, control proceeds to step 412. If it is determined at step 410 that none of the keys of dialog 702 is pressed, control proceeds to step 414. At step 414, CPU 180 determines whether or not an area outside dialog 702 has been pressed. If it is determined at step 414 that an area outside dialog 702 has been pressed, control proceeds to step 416. If it is determined at step 414 that no area outside dialog 702 has been pressed, control returns to step 410. Therefore, through steps 410 and 414, control waits until a key in dialog 702 or an area outside dialog 702 is pressed.

Figure 11:
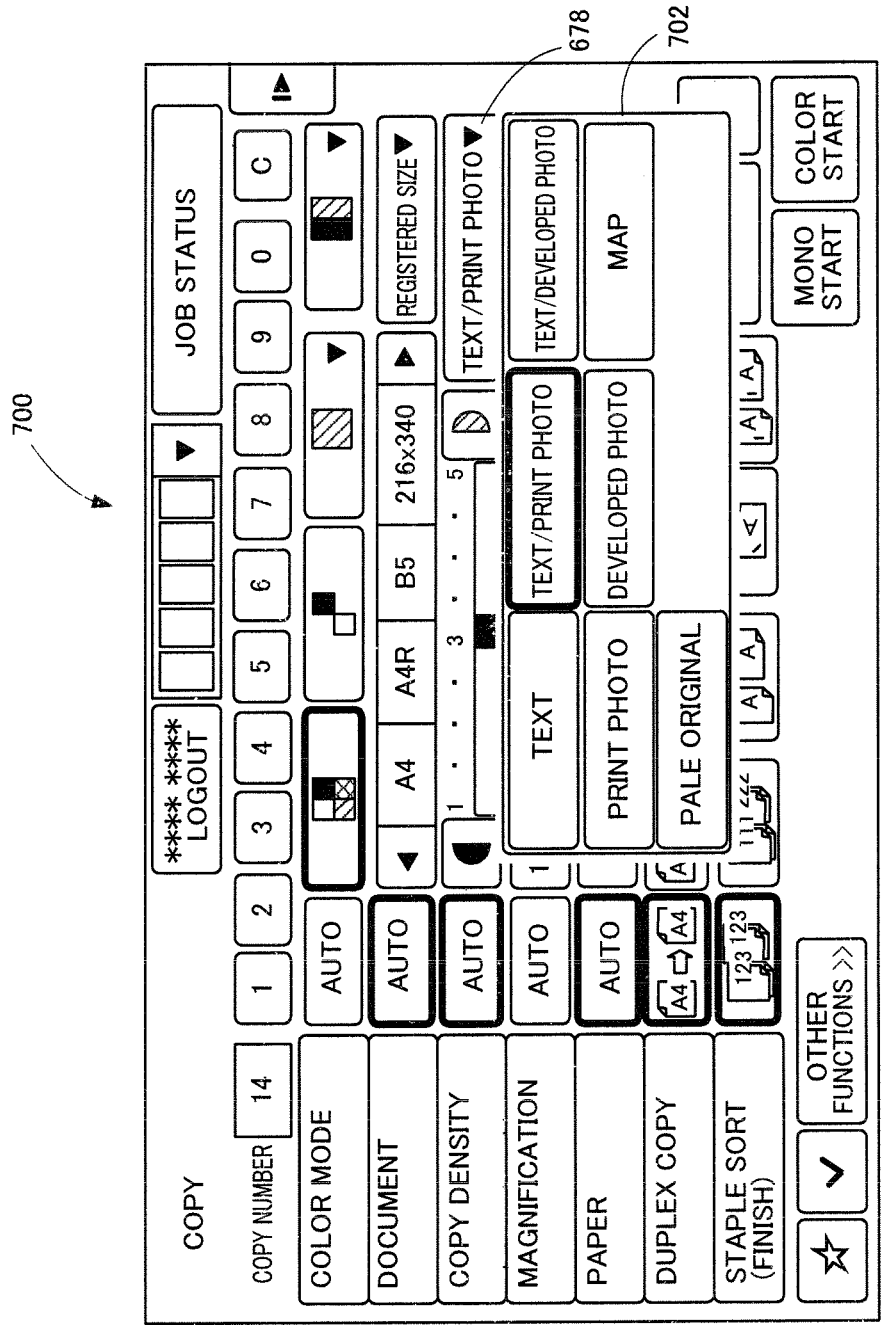
FIG. 11 shows an example of a state in which a dialog is displayed in a pull-down form on the express mode screen image shown in FIG. 9.

If a key in dialog 702 is pressed by the user, at step 412, CPU 180 shows the pressed key in a distinguishable manner for a short period of time to help clear visual recognition of the key selected (pressed) by the user and, thereafter, erases dialog 702. In FIG. 11, selection of "text/print photo" is indicated by the thick frame. Thereafter, at step 404, CPU 180 reflects the designated function setting. Thereafter, control returns to the main routine.

If an area outside dialog 702 is pressed by the user, at step 416, CPU 180 erases dialog 702. Then, control returns to the main routine.

In the manner as described above, it is possible to display details of function setting status of image forming apparatus 150 at one time and to display a screen image for receiving any change of setting. Therefore, it is possible for the user to grasp at once the set functions as a whole. Further, it is possible for the user to quickly find a setting to be changed and to easily change the setting.

Figure 12:
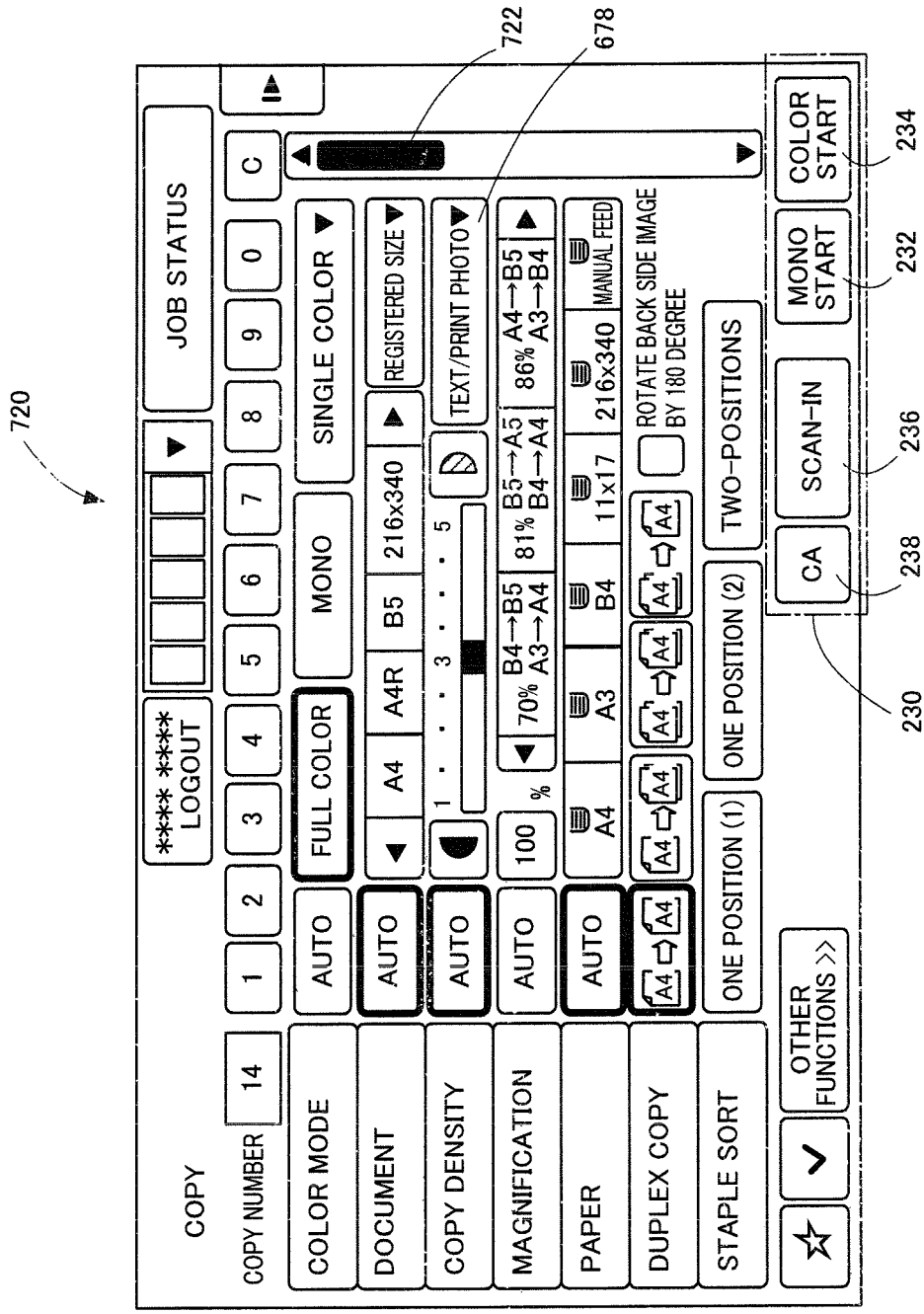
FIG. 12 shows another example of the express mode screen image.
Figure 13:
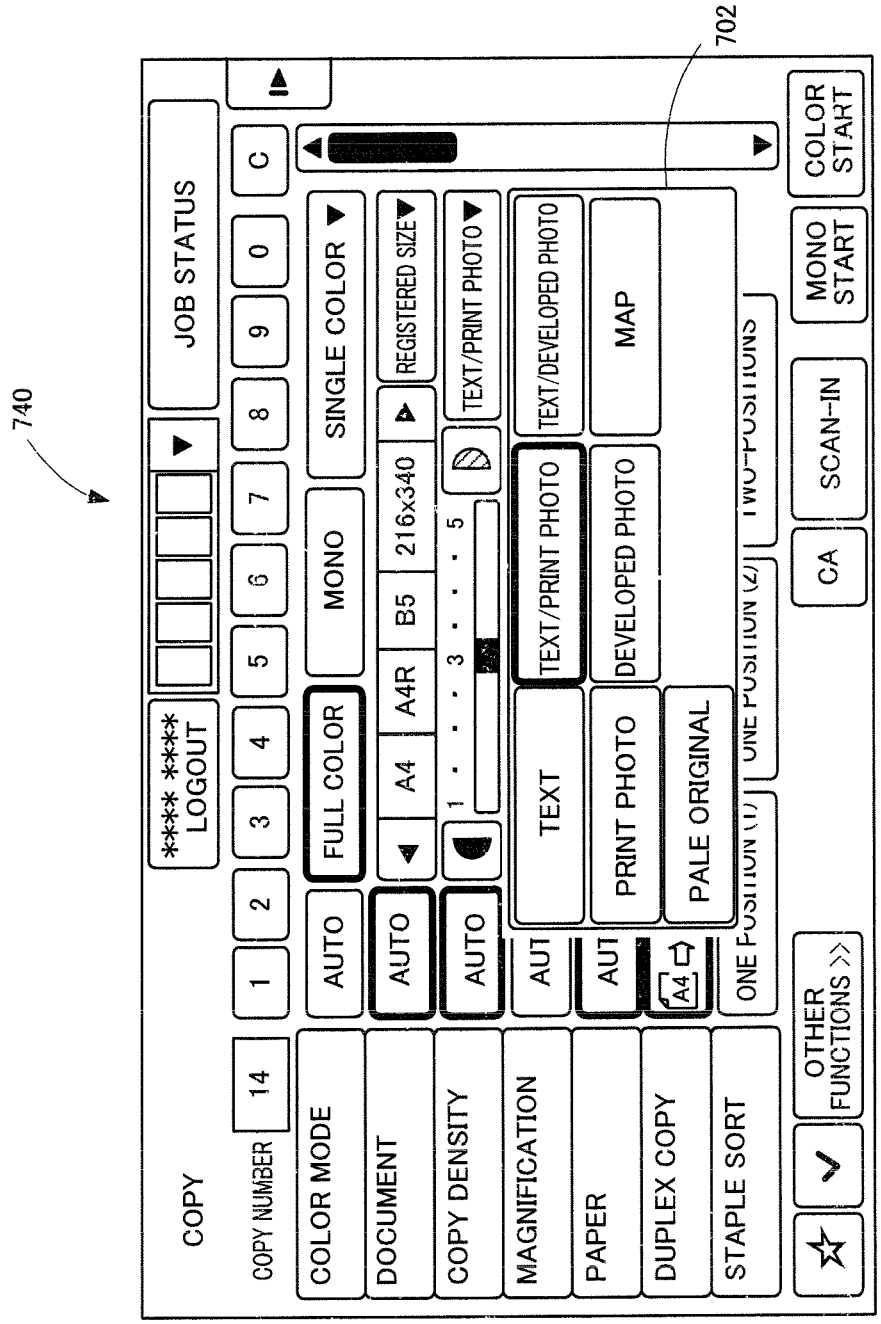
FIG. 13 shows an example of a state in which a dialog is displayed in the pull-down form in the express mode screen image shown in FIG. 12.

In the foregoing, an example has been described in which the key arrangement of task trigger area 230 is unchanged in the regular mode and the express mode. The example, however, is not limiting. By way of example, the key arrangement of task trigger area 230 may be changed in the express mode screen image as shown in FIG. 12. Different from express mode screen image 660 shown in FIG. 9, in express mode screen image 720 shown in FIG. 12, the key arrangement in the task trigger area is changed and a scroll bar 722 is displayed. In express mode screen image 720, task trigger keys are arranged horizontally in line. Arrangement of other keys is the same as in express mode screen image 660. Therefore, the programs and screen image displays described above are similarly applicable to express mode screen image 720. For instance, if text/print photo key 678 is pressed on express mode screen image 720, a dialog 702 is displayed below text/print photo key 678 as shown in a screen image 740 of FIG. 13.

Figure 14:
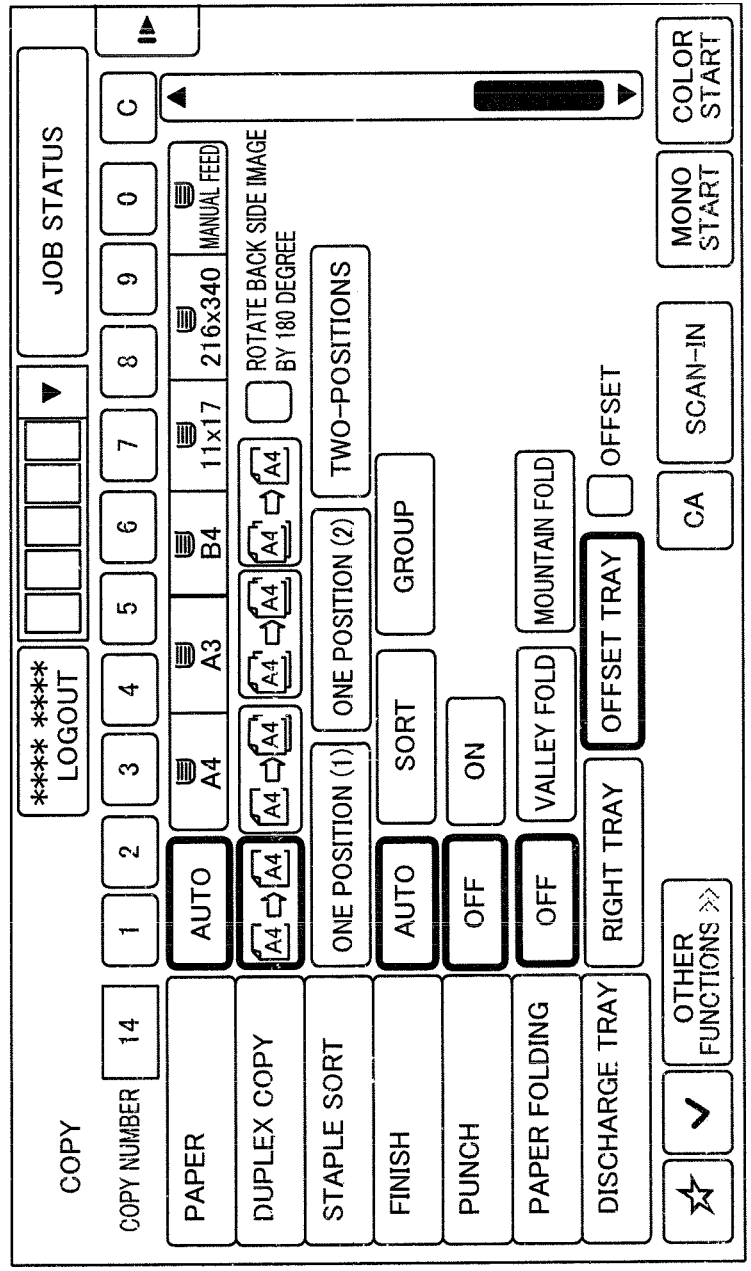
FIG. 14 shows an example of a displayed screen image when a scroll bar is slid on the express mode screen image shown in FIG. 12.

In express mode screen image 720 also, as in regular mode screen image 600, function setting keys other than the displayed function setting keys may be displayed by pressing "other functions" key. In express mode screen image 720, function setting keys other than the displayed function setting keys may be displayed using scroll bar 722. Screen image 760 shown in FIG. 14 shows a state in which scroll bar 722 is scrolled downward in screen image 720. In screen image 760, function setting keys (color mode key, document key, copy density key, magnification key) displayed on screen image 720 and detailed setting items related to these keys, are erased. On screen image 760, function setting keys (finish key, punch key, paper folding key, discharge tray key) not displayed on screen image 720 and detailed setting items related to these keys are displayed.

Figure 15:
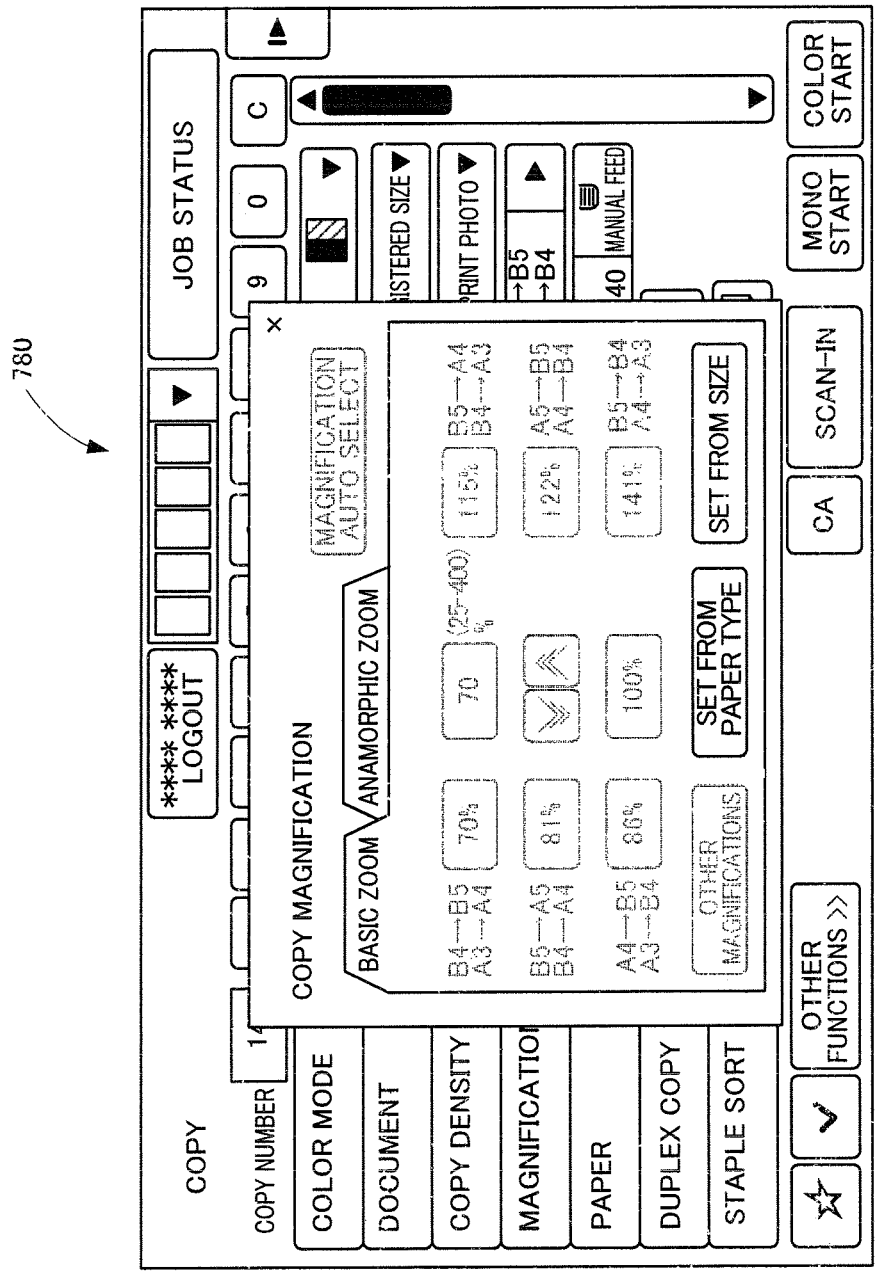
FIG. 15 shows another example of the screen image displayed when the magnification key is pressed on the express mode screen image.

In the foregoing, an example has been described in which some of the keys (only the keys not displayed on the detailed settings area) are displayed in the detailed settings window as shown in FIG. 10 if a function setting key is pressed on the express mode screen image. The example, however, is not limiting. Any display may be used provided that the items (keys) settable only by the detailed settings window opened when a function setting key is pressed on the regular mode screen image, that is, the items not directly settable in the detailed settings area on the express mode screen image, are displayed in a manner distinguishable from other items. By way of example, as shown by a screen image 780 of FIG. 15, the keys displayed in the detailed settings area may be displayed in a less noticeable (dim) manner with, for example, lower brightness (thin in FIG. 15). Further, the items settable only by the detailed settings window of the regular mode may be displayed in an emphasized manner (for example, with a thick frame, or in a color different from the surroundings), and the items settable in the express mode may be displayed in a normal manner. If items (keys) settable in the express mode screen image are displayed in the detailed settings window, it is preferred to have these keys inoperable even when pressed. Here, it is more preferable to post a message notifying that there is no settable item.

If there is no item that is settable only in the regular mode, that is, if all detailed items can be set on the express mode screen image, the following manners of display may be used. For instance, the detailed settings window is not displayed even if a function setting key is pressed. Alternatively, a detailed settings window not including any item (key) is displayed if a function setting key is pressed. Alternatively, the detailed settings window is displayed with all items displayed in a dim manner. If such a manner of display is used, it is preferable to post a message notifying that there is no settable item.

Further, an example has been described in which the ten keys and the clear key are displayed horizontally in line above detailed settings area 662 and task trigger keys are arranged horizontally in line below detailed settings area 662. The example, however, is not limiting. By way of example, the ten keys and the clear key may be displayed horizontally in line below detailed settings area 662. Further, the task trigger keys may be displayed horizontally in line above detailed settings area 662.

Further, in the foregoing, an example in which a dialog is displayed in a pull-down form below a pressed key has been described. The example, however, is not limiting. By way of example, a dialog may be displayed in a pull-up form above the pressed key.

Further, an example has been described in which at step 320, determination is made as to whether a flick operation to the left has been made on detailed settings area 662. The example, however, is not limiting. By way of example, determination may be made as to whether a flick operation to the left has been made on function setting area 200.

Further, the operation for displaying or erasing detailed settings area 662 is not limited to the flick operation. For instance, the operation for displaying detailed settings area 662 may be an operation of moving one's finger to the right while continuously touching the surface of function setting area 200 (sliding operation). Here, the operation for erasing detailed settings area 662 is preferably a sliding operation to the left on detailed settings area 662.

Though an example in which the detailed settings area is displayed by a flick operation to the right has been described, the example is not limiting. The operation may be appropriately modified, in accordance with the position where the function setting area is displayed on the screen image. Specifically, if there is any area (free area) in which the detailed settings area can be displayed around the function setting area, the detailed settings area is displayed if a flick operation is made from the function setting area toward the free area. By way of example, if the function setting area is arranged on the right end of display unit 164, the detailed settings area is displayed on the left side of the function setting area in response to a flick operation to the left. Here, the detailed settings area is erased in response to a flick operation to the right.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An information input device, comprising a display unit that displays an information input screen image allowing input of information, and an input unit that is arranged on said display unit and specifies a designated position on said information input screen image; wherein
    a plurality of function setting keys are displayed on a function setting area displayed on a part of said information input screen image;
    in response to detection of a prescribed operation by said input unit on any of said function setting keys displayed in said function setting area, said display unit enters an express mode and displays setting items corresponding to each of said plurality of function setting keys as detailed setting items, emphasizing a present state of a detailed setting item displayed in a distinguishable manner corresponding to a respective function setting key, in correspondence with said function keys, on said information input screen image, while maintaining display of said plurality of function setting keys; and
    said prescribed operation is a flick operation or a sliding operation different from an operation for selecting, when the position of any of said function setting keys is specified by said input unit, setting items corresponding to the function setting key.

2. The information input device according to claim 1, wherein the detailed: setting items displayed in correspondence with each of said function setting keys are setting items selected in order of frequency of use from among a plurality of setting items corresponding to each of said function setting keys.

3. The information input device according to claim 1, wherein said display unit displays a set detailed setting item in a noticeable manner, among the detailed setting items displayed in correspondence with each of said function setting keys.

4. The information input device according to claim 1, wherein ten keys for numerical input are displayed horizontally in line on said information input screen image; and said ten keys are positioned above or below said detailed setting items.

5. The information input device according to claim 1, wherein a plurality of task trigger keys for instructing an operation of an apparatus as an object of function setting are arranged horizontally in line on said information input screen image; and said plurality of task trigger keys are positioned above or below said detailed setting items.

6. The information input device according to claim 1, wherein at least one of said detailed setting items has a dialog displayed in a pull-down form on said information input screen image if position of said detailed setting item is specified by said input unit, said dialog includes further setting items corresponding to the specified detailed setting item; and said detailed setting item having said dialog displayed is displayed at an upper portion of said information input screen image.

7. The information input device according to claim 1, wherein said display unit displays, if a position of any of said function setting keys is specified by said input unit with said detailed setting items being displayed, a sub-screen including items other than said displayed detailed setting items, among setting items related to said function setting key.

8. The information input device according to claim 7, wherein said sub-screen includes only items other than said displayed detailed setting items, among setting items related to said function setting key.

9. The information input device according to claim 7, wherein among the setting items related to said function setting key, items other than said displayed detailed setting items are displayed in more distinguishable manner than said displayed detailed setting items, in said sub-screen.

10. An image processing apparatus, comprising:
An information input device that includes:
A display unit that displays an information input screen image allowing input of information, and an input unit that is arranged on said display unit and specifies a designated position on said information input screen image; wherein
a plurality of function setting keys are displayed on a function setting area displayed on a part of said information input screen image;
in response to detection of a prescribed operation by said input unit on any of said function setting keys displayed in said function setting area, said display unit enters an express mode and displays setting items corresponding to each of said plurality of function setting keys as detailed setting items, emphasizing a present state of a detailed setting item displayed in a distinguishable manner corresponding to a respective function setting key, in correspondence with said function keys, on said information input screen image, while maintaining display of said plurality of function setting keys; and
said prescribed operation is a flick operation or a sliding operation different from an operation for selecting, when the position of any of said function setting keys is specified by said input unit, setting items corresponding to the function setting key; and
receiving a user operation through said information input device.

11. A method of controlling an information input device that includes a display unit that displays an information input screen image allowing input of information, and an input unit that is arranged on said display unit and specifies a designated position on said information input screen image, comprising the steps of:
displaying, on a function setting area displayed on a part of said information input screen image, a plurality of function setting keys;
detecting a prescribed operation made by said input unit on any of said function setting keys displayed in said function setting area; and
in response to detection of the prescribed operation made by said input unit on any of said function setting keys displayed in said function setting area, entering an express mode and displaying setting items corresponding to each of said plurality of function setting keys as detailed setting items, emphasizing a present state of a detailed setting item displayed in a distinguishable manner corresponding to a respective function setting key, in correspondence with said function keys, on said information input screen image, while maintaining display of said plurality of function setting keys; wherein
said prescribed operation is a flick operation or a sliding operation different from an operation for selecting, when the position of any of said function setting keys is specified by said input unit, setting items corresponding to the function setting key.

12. The control method according to claim 11, wherein the detailed setting items displayed in correspondence with each of said function setting keys are setting items selected in order of frequency of use from among a plurality of setting items corresponding to each of said function setting keys.

13. The control method according to claim 11, further comprising the step of displaying a set detailed setting item in a noticeable manner, among the detailed setting items displayed in correspondence with each of said function setting keys.

14. The control method according to claim 11, further comprising the step of displaying ten keys for numerical input horizontally in line on said information input screen image; wherein said ten keys are positioned above or below said detailed setting items.

15. The control method according to claim 11, further comprising the step of displaying a plurality of task trigger keys for instructing an operation of an apparatus as an object of function setting, horizontally in line on said information input screen image; wherein said plurality of task trigger keys are positioned above or below said detailed setting items.

16. The control method according to claim 11, wherein at least one of said detailed setting items has a dialog displayed in a pull-down form on said information input screen image if the position of said detailed setting item is specified by said input unit, said dialog includes further setting items corresponding to the specified detailed setting item; and said detailed setting item having said dialog displayed is displayed at an upper portion of said information input screen image.

17. The control method according to claim 11, further comprising the step of displaying, if a position of any of said function setting keys is specified by said input unit with said detailed setting items being displayed, a sub-screen including items other than said displayed detailed setting items, among setting items related to said function setting key.

18. The control method according to claim 17, wherein said sub-screen includes only items other than said displayed detailed setting items, among setting items related to said function setting key.

19. The control method according to claim 17, wherein among the setting items related to said function setting key, items other than said displayed detailed setting items are displayed in more distinguishable manner than said displayed detailed setting items, in said sub-screen.

* * * * *